H. STUKART.
SHARPENING DEVICE FOR KNIVES OF MEAT SLICING MACHINES.
APPLICATION FILED SEPT. 16, 1912.
1,051,646.
Patented Jan. 28, 1913.
2 SHEETS—SHEET 2.
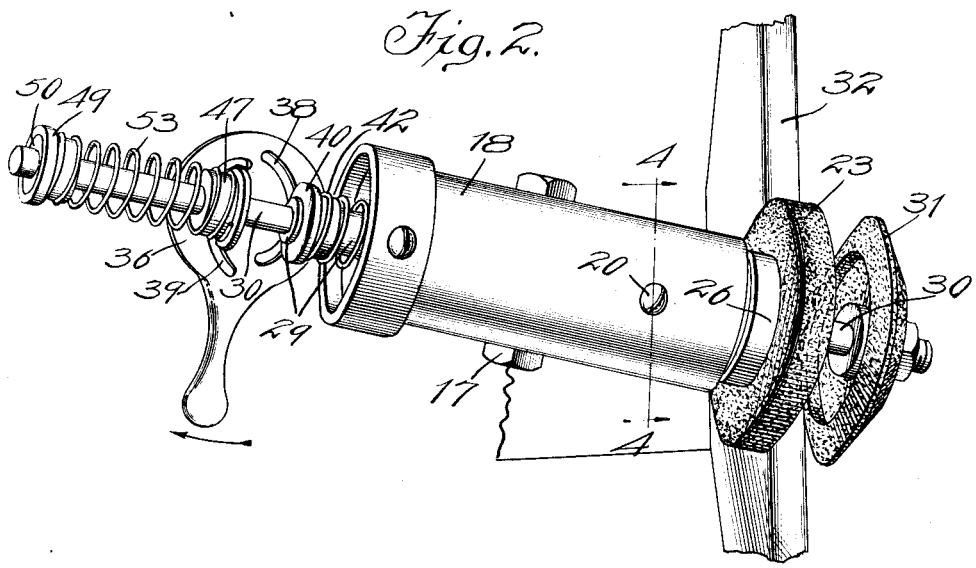
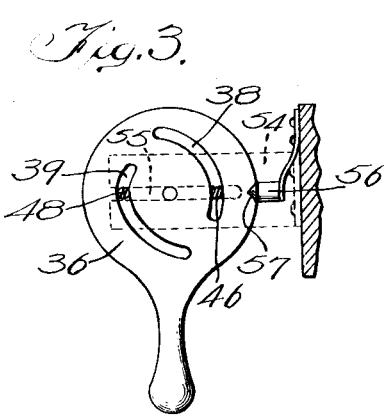
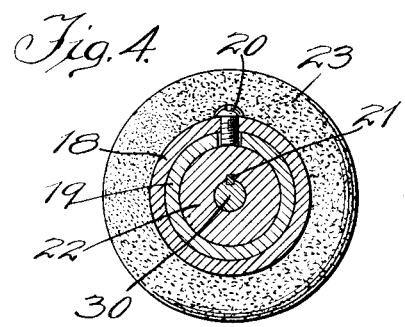
Witnesses:
W. T. Kilroy
R. Burkhardt
Inventor
Hendrik Stukart
By J. A. Jochum, Jr.
Atty.

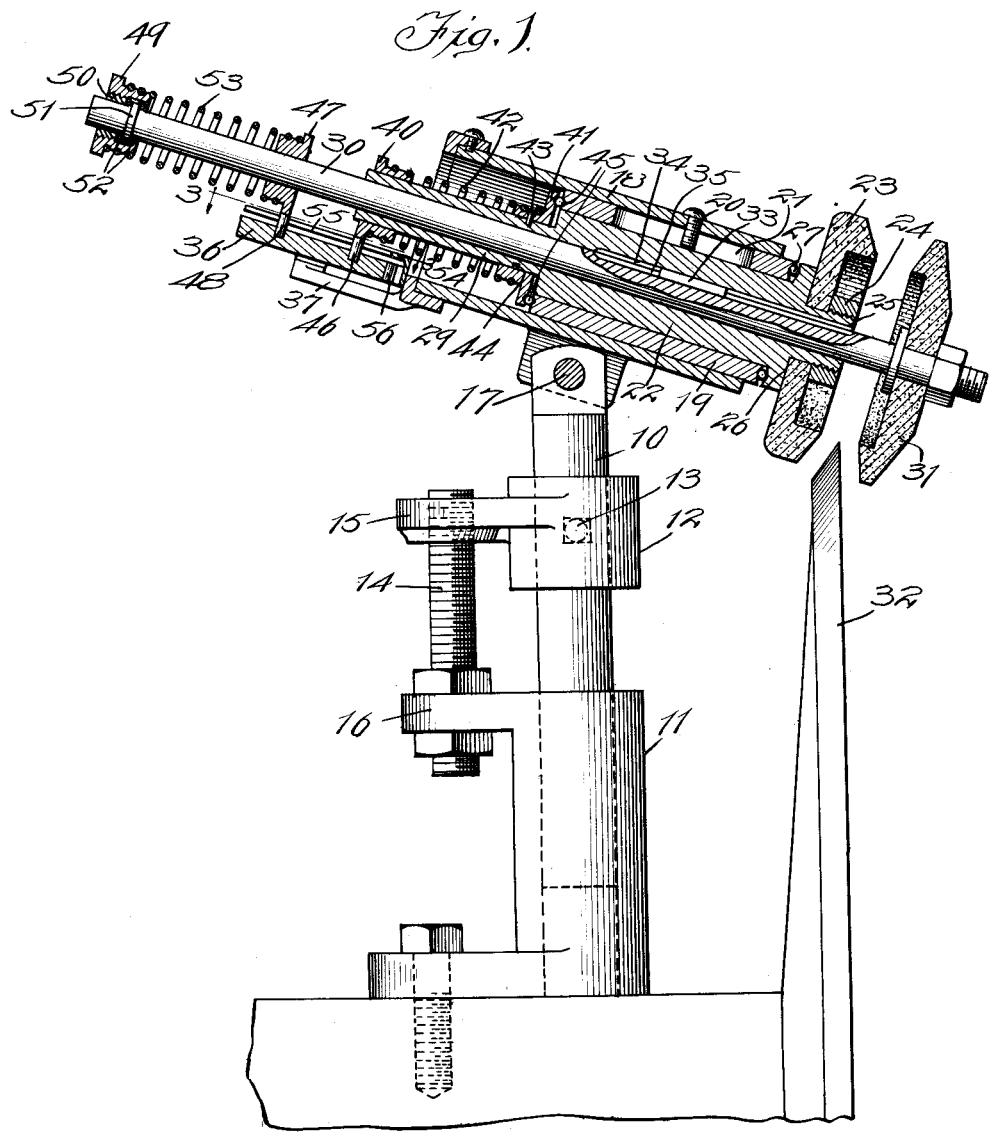

UNITED STATES PATENT OFFICE.

HENDRIK STUKART, OF ROTTERDAM, NETHERLANDS, ASSIGNOR TO U. S. SLICING MACHINE COMPANY, OF CHICAGO, ILLINOIS, A CORPORATION OF ILLINOIS.

SHARPENING DEVICE FOR KNIVES OF MEAT-SLICING MACHINES.

1,051,646.  Specification of Letters Patent.  Patented Jan. 28, 1913.

Application filed September 16, 1912. Serial No. 720,464.

*To all whom it may concern:*

Be it known that I, HENDRIK STUKART, a subject of the Ruler of the Netherlands, residing in Rotterdam, in the Kingdom of the Netherlands, have invented certain new and useful Improvements in Sharpening Devices for Knives of Meat-Slicing Machines, of which the following is a specification.

This invention relates to improvemnts in devices for sharpening the rotary circular knives of meat slicing machines, and has for its primary object to provide an improved device of this class by means of which the knife may be rapidly sharpened, and when not in use may be readily thrown out of operation or removed from the machine, and which sharpening device embodies rotary sharpeners adapted to engage opposite sides of the knife and to be successively moved into and out of operative position.

A further object is to provide an improved device of this class which will be simple, durable, cheap and compact in construction and efficient in operation.

To the attainment of these ends and the accomplishment of other new and useful objects as will appear the invention consists in the features of novelty in substantially the construction, combination and arrangement of the several parts hereinafter more fully described and claimed, and shown in the accompanying drawings illustrating the invention and in which—

Figure 1 is a view partly in elevation and partly in vertical section, showing an improved device of this class constructed in accordance with the principles of this invention. Fig. 2 is a top plan view of the parts shown in Fig. 1. Fig. 3 is a detail sectional view taken on line 3—3, Fig. 1. Fig. 4 is a sectional view taken on line 4—4, Fig. 1.

In the present form of the invention, two grinders or sharpener disks are provided one of which is adapted to act on each side of the knife and these sharpeners are also adapted to be successively moved into and out of engagement with the respective sides of the knife. This is necessary, or rather advisable, because the bevel side of the knife requires more sharpening than the other side, in fact it is only necessary to sharpen the side of the knife opposite to the side containing the bevel sufficiently to remove the bur or wire edge that is formed on that side by the grinding of the bevel side. Therefore, in the present construction and by the provision of means whereby these grinders may be successively moved into and out of operative positions and relatively with respect to each other, it will be manifest that the sharpener which acts on the bevel side may be thrown into operation while the other sharpener remains out of engagement with its side of the knife until the sharpening is nearly completed at which time the last mentioned sharpener may be moved so as to contact with its side of the knife and thereby remove the wire edge or bur.

Referring more particularly to the drawings and in the present exemplification of this invention, there is provided an upright supporting member 10 which is preferably in the form of a stem adjustably mounted in a socket 11 for rotary movement with respect to the socket, and also for movement upwardly and downwardly. This latter adjustment may be accomplished by means of a collar 12 secured to the stem 10 by means of a suitable fastening device 13. An adjusting screw 14 engages a projection 15 on the collar and a projection 16 on the socket. When it is desired to rotate the stem in the socket and sleeve 12 all that is necessary is to loosen the fastening device 13.

Connected with the stem 10, preferably at the upper extremity thereof and on the horizontal pivot 17 is a sleeve 18 within which sleeve is a bearing 19, mounted to slide longitudinally therein. The degree of longitudinal movement of the bearing with respect to the sleeve is controlled preferably by means of a pin and slot connection 20—21, which connection also prevents the bearing and sleeve from becoming disengaged.

Rotatably mounted in the bearing 19 is a tubular spindle 22 which is of a length somewhat greater than the length of the bearing and also of the sleeve. A grinder 23 is connected with the spindle adjacent one end thereof in a manner that it will rotate with the spindle and also so that it may be detached from the spindle. This is accomplished preferably by means of a nut or collar 24 which detachably engages a reduced threaded extremity 25 of the spindle and which extremity passes through the grinder so that the collar and shoulder portion 26 of the spindle all coöperate to clamp the grinder thereto. The shoulder portion 26 of the spindle is formed by increasing the diameter of the spindle adjacent one end and one face of this enlarged portion coöperates with the adjacent end of the sleeve 19 to form a race for the balls 27, thereby providing a ball bearing between the extremity of the sleeve and a coöperating portion of the spindle to reduce friction between the parts. The other extremity of the spindle 22 projects beyond the other end of the sleeve 19 and is reduced to form a tubular extension 29 which extension may be of any desired length and for the purpose to be set forth.

A second spindle 30 telescopes with the spindle 22 and is of a length somewhat greater than the length of the spindle 22 and also of the sleeve 18. One extremity of this spindle 30 projects beyond the front face of the grinder 23, and a grinder 31 is removably secured to this extremity and so arranged with relation to the grinder 23 as to form a space therebetween into which space a portion of the knife or cutter 32 projects. This will cause the grinders to stand on opposite sides of the knife and when not in use the grinders will assume positions out of engagement with the respective faces of the knife as shown in Fig. 1, and the grinders 22—31 are preferably angularly disposed with relation to a horizontal plane.

In order to cause the grinders 23, 31 to rotate simultaneously and yet permit the spindles to be relatively adjusted longitudinally one with relation to the other, to move the grinders successively into and out of engagement with the respective faces of the knife, there is provided in the present form of the invention a key 33 which engages in coöperating grooves 34 and 35 respectively in the spindles 22, 30.

In the present form of the invention the controlling means for thus adjusting the spindles and grinders comprises a controlling element 36 which is pivotally mounted upon an arm or bracket 37, the latter being preferably connected with the sleeve 18. This element 36 is provided with cam slots 38, 39, a portion of each slot being concentric with the pivot of the element 36 while another portion of each slot is eccentric with the pivot. Loosely mounted upon the reduced extremity 29 of the spindle 22 is a collar 40 and a second collar 41 is also loosely mounted on this extremity of the spindle 22 and is spaced from the collar 40. An elastic member 42, preferably in the form of a coiled spring surrounds the extremity of the spindle and the extremities of this elastic member are secured or anchored respectively to the collars 40, 41. In order to cause the collar 41 to move with the spindle 22 when the latter is shifted longitudinally, while at the same time permit of a relative rotary movement between the spindle and collar, a pin or lug 43 is provided on the collar which projects into a circumferential groove in the extremity of the spindle. This collar 41 is arranged adjacent the extremity of the sleeve 19 and a ball bearing 45 of any desired construction is provided between the abutting parts to reduce friction. The collar 40 is provided with a pin or projection 46 which enters the cam slot 38 in the element 36. A collar 47 similar to the collar 40 is loosely sleeved upon the spindle 30 adjacent the element 36 and is provided with a pin or projection 48 which enters the other cam slot 39 in the element. Connected with the spindle 30, preferably adjacent one end thereof and spaced from the sleeve 47, is another sleeve 49 which coöperates with a fastening nut or collar 50 and a shoulder 51 on the spindle so as to lock the sleeve to the spindle against longitudinal movement with respect to the spindle, but in such a manner that a relative rotary movement may be obtained between the spindle and sleeve. Any form of ball bearing 52 may be provided between the sleeve 49 and spindle to reduce friction. An elastic member 53, preferably in the form of a coiled spring surrounds the spindle 30 between the collars 47, 49 and the extremities of this elastic member are anchored or secured to the respective sleeves.

The grinders are rotated by frictional engagement of the knife therewith and when rotated the respective spindles will be rotated. In order therefore to prevent the pins or projections 46, 48 on the sleeves 40, 47, from disengaging the respective cam slots in the element 36 during such rotation, any suitable means may be provided. A simple and efficient means comprises a member 54 having a slot 55 therein and into which slot the pins or projections 46, 48, extend. If desired, a spring controlled locking dog 56 may be provided which is adapted to enter a suitable recess 57 in the element 36 to hold the sharpeners out of engagement with the knife when the sharpeners are not in use.

It is thought that the operation of this improved construction will be apparent from the above description, but briefly stated it is as follows: Assuming the parts to be in the position shown in Figs. 1 and 2 and it is desired to sharpen the knife; the operator grasps the handle of the element 36 and rotates it about its pivot in the direction indicated by the arrow in Fig. 2, or toward the left. The rotation of this member will cause the eccentric part of the cam slot 38, through the medium of the projection 46 on the collar 40 to shift the spindle 22 and bearing 19 longitudinally in the sleeve 18 and thereby move the grinder 23 into engagement with the bevel face of the knife 32. This is accomplished through the elastic connection 42 between the collar and the spindle. The eccentric portion of the slot 38 is of such a length that the desired pressure on the bevel face may be obtained by the compression of the elastic member, while at the same time should there be any irregularity in that face of the knife, the elastic member 42 will yield to permit the sharpener 23 to be shifted by such irregularity. During the movement of the spindle 22 and the grinder 23 toward the bevel face of the knife by the element 36, the projection 48 on the sleeve 47 which is connected to the spindle 30 by the elastic member 53, will be moving through the concentric portion of the slot 39 and therefore the grinder 31 will not be shifted laterally with respect to the knife and other sharpener. Therefore, it will be manifest that this grinder 23 may be held in engagement with the bevel side of the knife as long as desired or until the sharpening is about completed. At this time, or whenever desired, the handle of the element 36 may be shifted still farther in the same direction to cause the pin 48 on the sleeve 47 to move through the eccentric portion of the slot 39 which will cause the spindle 30 to be shifted longitudinally with respect to the spindle 22 to draw the sharpener 31 into engagement with its face of the knife. At the same time tension will be exerted upon the spring 53 until the desired pressure of the sharpener 31 against its side of the knife is obtained. Obviously, the elastic member 53 will yield to permit the sharpener 31 to be shifted laterally with respect to the knife and the sharpener 23 when any irregularity in that face of the knife is encountered. After the sharpening has been completed, the element 36 is rotated in the opposite direction about its pivot which will cause the sharpeners to be shifted laterally with respect to each other and also in directions away from each other and from the respective sides of the knife.

With this improved construction it will be manifest that the parts are compactly arranged and only one set of ball bearings 27, 45, is necessary for both of the spindles.

While in the present form of the invention the preferred form of the construction has been shown and described, it is to be understood that many changes may be made in the details of construction and arrangement of the parts, within the scope of the claims, without departing from the spirit of the invention.

What is claimed as new is:—

1. In a sharpening device of the class described, the combination of a sharpener for acting on each side of the knife, said sharpeners having a common axis of rotation, and means for moving both of the sharpeners into and out of engagement with the respective faces of the knife and relatively with respect to each other.

2. In a sharpening device of the class described, the combination of a sharpener for acting on each side of the knife, said sharpeners having a common axis of rotation, and means for moving the sharpeners into and out of engagement with the respective faces of the knife and laterally in directions toward and away from each other, the said sharpeners being arranged in an angular position with relation to a horizontal plane.

3. In a sharpening device of the class described, the combination of a sharpener for each side of the knife, rotatable spindles for the sharpeners, said spindles telescoping with each other, and means for shifting both of the spindles longitudinally and relatively one with respect to the other.

4. In a sharpening device of the class described, the combination of a sharpener for each side of the knife, rotatable spindles for the sharpeners, said spindles telescoping with each other, means for shifting both of the spindles longitudinally and relatively one with respect to the other, and means connecting the spindles for simultaneous rotation.

5. In a sharpening device of the class described, the combination of a sharpener for each side of the knife, rotatable spindles for the sharpeners, one of the spindles being sleeved over the other, and cam means for relatively shifting the spindles longitudinally with respect to the other.

6. In a sharpening device of the class described, the combination of a sharpener for each side of the knife, rotatable telescoping spindles to each of which one of the sharpeners is connected, a controlling element for shifting the sharpeners in directions toward and away from each other and into and out of engagement with the respective sides of the knife, and yielding means between the controlling element and each of the sharpeners.

7. In a sharpening device of the class described, the combination of a sharpener for acting on each side of the knife, a rotatable spindle connected with each of the sharpeners, said spindles being arranged one within the other, means for causing a simultaneous rotation of the spindles, and means for shifting the spindles relatively to move the sharpeners into and out of engagement with the respective sides of the knife and relatively with respect to each other, the sharpeners being arranged in angular position with relation to a horizontal plane.

8. In a sharpening device of the class described, the combination of telescoping rotatable spindles, a sharpener connected with each of the spindles, one of the sharpeners being adapted to act on each side of the knife, means for shifting the spindles longitudinally one with relation to the other, and means securing the spindles together for simultaneous rotation, the sharpeners being arranged in angular position with relation to a horizontal plane.

9. In a sharpener of the class described the combination of telescoping rotatable spindles, a sharpener connected with each spindle, one of the sharpeners operating on each side of the knife, means securing the spindles together for simultaneous rotation and for relative adjustment longitudinally to move the sharpeners into and out of engagement with the respective sides of the knife, and means for moving both of the spindles longitudinally.

10. In a sharpener of the class described the combination of telescoping rotatable spindles, a sharpener connected with each spindle, one of the sharpeners operating on each side of the knife, means securing the spindles together for simultaneous rotation and for relative adjustment longitudinally to move the sharpeners into and out of engagement with the respective sides of the knife, and cam means for thus adjusting the spindles longitudinally.

11. In a sharpener of the class described the combination of telescoping rotatable spindles, a sharpener connected with each spindle, one of the sharpeners operating in each side of the knife, means securing the spindles together for simultaneous rotation and for relative adjustment longitudinally to move the sharpeners into and out of engagement with the respective sides of the knife, a controlling element for thus adjusting the spindles longitudinally, and a yielding connection between the said controlling element and each of the spindles.

12. In a sharpener of the class described, the combination of telescoping rotatable spindles, a sharpener connected with each of the spindles, the sharpeners acting on opposite faces of the knife and arranged in angular position with relation to a horizontal plane, said spindles being shiftable longitudinally one with relation to the other to move the sharpeners into and out of engagement with the respective sides of the knife, and one in advance of the other, and means for thus moving the spindle.

13. In a sharpener of the class described, the combination of telescoping rotatable spindles, a sharpener connected with each of the spindles, the sharpeners acting on opposite faces of the knife, said spindles being shiftable longitudinally one with relation to the other to move the sharpeners into and out of engagement with the respective sides of the knife, and means for causing such movement to be successive.

14. In a sharpener of the class described, the combination of telescoping rotatable spindles, means connecting the spindles for simultaneous rotation but for adjustment longitudinally one with relation to the other, a sharpener connected with each spindle, one sharpener acting on each face of the knife, said sharpeners being movable by the relative longitudinal adjustment of the spindles to move them into and out of engagement with the respective faces of the knife and means for causing such movements of the sharpeners to be successive.

15. In a sharpener of the class described, the combination of concentric rotatable spindles, a sharpener connected with each spindle and acting on opposite sides of the knife, said spindles being shiftable longitudinally one with relation to the other to move the sharpeners into and out of engagement with the respective sides of the knife, and means for controlling such relative movement of the spindles, said means embodying a controlling element and an elastic connection between the element and each of the spindles.

16. In a sharpener of the class described, the combination of concentric rotatable spindles, a sharpener connected with each spindle and acting on opposite sides of the knife, said spindles being shiftable longitudinally one with relation to the other to move the sharpeners into and out of engagement with the respective sides of the knife, means adjustably connecting the spindles for simultaneous rotation, and means for controlling such relative movement of the spindles, said means embodying a controlling element and an elastic connection between the element and each of the spindles.

17. In a sharpener of the class described, the combination of concentric rotatable spindles, a sharpener connected with each spindle and acting on opposite sides of the knife, said spindles being shiftable longitudinally one with relation to the other to move the sharpeners into and out of engagement with the respective sides of the knife, interengaging means between the spindles adjustably connecting them for simultaneous rotation, and means for controlling such relative movement of the spindles, said means embodying a controlling element and an elastic connection between the element and each of the spindles, the said sharpeners being arranged in angular position with relation to a horizontal plane.

18. In a sharpener of the class described, the combination of concentric rotatable spindles, a sharpener connected with each spindle and acting on opposite sides of the knife, said spindles being shiftable longitudinally one with relation to the other to move the sharpeners into and out of engagement with the respective sides of the knife, and means for controlling such relative movement of the spindles, said means embodying a cam element yieldingly connected with each of the spindles.

19. In a sharpener of the class described, the combination of concentric rotatable spindles, a sharpener connected with each spindle and acting on opposite sides of the knife, said sharpeners being shiftable longitudinally one with relation to the other to move the sharpeners with relation to each other and into and out of engagement with the knife, and means for causing the last recited movements to be successive, said means embodying a cam device yieldingly connected with each of the sharpeners.

20. In a sharpener of the class described the combination of concentric rotatable spindles, a sharpener connected with each spindle and acting on opposite sides of the knife, means adjustably connecting the sharpeners for simultaneous rotation, said sharpeners being shiftable longitudinally one with relation to the other to move the sharpener with relation to the other and into and out of engagement with the knife, and means for causing the last recited movements to be successive, said means embodying a cam device yieldingly connected with each of the sharpeners.

21. In a sharpener of the class described, the combination of concentric rotatable spindles, a sharpener connected with each spindle for rotation therewith, said spindles being adjustable one with relation to the other whereby the sharpeners may be moved into and out of engagement with the respective faces of the knife, and means for causing such movement of the sharpeners to be successive, the said means embodying a controlling and coöperating elements relatively movable, one of which is yieldingly connected with each of the spindles.

22. In a sharpener of the class described, the combination of concentric rotatable spindles, a sharpener connected with each spindle for rotation therewith, said spindles being adjustable one with relation to the other whereby the sharpeners may be moved into and out of engagement with the respective faces of the knife, and means for causing such movement of the sharpeners to be successive the said means embodying a controlling and coöperating elements relatively movable, said coöperating elements being sleeved on the respective spindles and yieldingly connected therewith.

23. In a sharpener of the class described, the combination of concentric rotatable spindles, a sharpener connected with each of the spindles for rotation therewith, said spindles being adjustable longitudinally one with relation to the other, a controlling element for causing such adjustment, said controlling element having cam faces, a pair of elements coöperating with the cam faces, one of the elements being sleeved on each of the spindles, the respective elements and spindles being capable of relative longitudinal adjustment, and an elastic connection between the respective spindles and the elements sleeved thereon.

24. In a sharpener of the class described, the combination of concentric rotatable spindles, a sharpener connected with each of the spindles for rotation therewith, said spindles being adjustable longitudinally one with relation to the other, a controlling element for causing such adjustment, said controlling element having cam faces, a pair of elements coöperating with the cam faces, one of the elements being sleeved on each of the spindles, the respective elements and spindles being capable of relative longitudinal adjustment, an elastic connection between the respective spindles and the elements sleeved thereon, and means for holding the last recited elements against rotation with their respective spindles.

25. In a sharpener of the class described, the combination of concentric rotatable spindles, a sharpener connected with each of the spindles for rotation therewith, said spindles being adjustable longitudinally one with relation to the other, a controlling element for causing such adjustment, said controlling element having cam faces, a pair of elements coöperating with the cam faces, one of the elements being sleeved on each of the spindles, the respective elements and spindles being capable of relative longitudinal adjustment, an elastic connection between the respective spindles and the elements sleeved thereon, and means for securing the spindles together for simultaneous rotation.

26. In a sharpener of the class described, the combination of a ball bearing rotatably mounted spindle, a second spindle telescoping therewith, a sharpener connected with each of the spindles and operating on opposite sides of the knife, said spindles being shiftable longitudinally and one with relation to the other to move the sharpeners in directions toward and away from each other and into and out of engagement with the respective faces of the knife, and means for controlling such movements.

27. In a sharpener of the class described, the combination of a ball bearing rotatably mounted spindle, a second spindle telescoping therewith, a sharpener connected with each of the spindles and operating on opposite sides of the knife said spindles being shiftable longitudinally, one with relation to the other to move the sharpeners in directions toward and away from each other and into and out of engagement with the respective faces of the knife, and means common to the sharpeners for controlling such movements, the said sharpeners being supported in angular position with relation to a horizontal plane.

28. In a sharpener of the class described, the combination of a ball bearing rotatably mounted spindle, a second spindle telescoping therewith, a sharpener connected with each of the spindles and operating on opposite sides of the knife, interlocking means between the spindles for securing them for simultaneous rotation and for relative longitudinal adjustment to move the sharpeners into and out of engagement with the respective sides of the knife, and means for controlling such relative movement of the spindle.

29. In a sharpening device of the class described, the combination of a sharpener for acting on each side of the knife, said sharpeners having a common axis of rotation, and means for moving the sharpeners into and out of engagement with the respective faces of the knife and relatively with respect to each other, said sharpeners being both rotatable by the engagement of the knife therewith.

30. An attachment for slicing machines comprising a sharpening device embodying a sharpener for each side of the knife, rotatable spindles for the sharpeners, said spindles telescoping with each other, and means for relatively shifting the spindles longitudinally one with respect to the other.

In testimony whereof I have signed my name to this specification, in the presence of two subscribing witnesses, on this 14th day of September A. D. 1912.

HENDRIK STUKART.

Witnesses:
FRANK N. REED,
J. H. JOCHUM, Jr.